United States Patent [19]

Meyerle

[11] Patent Number: 5,328,418
[45] Date of Patent: Jul. 12, 1994

[54] STEPLESS HYDROMECHANICAL MECHANISM WITH MULTIPLE POWER-TRANSMISSION PATHS, MORE PARTICULARLY FOR MOTOR VEHICLES

[76] Inventor: Michael Meyerle, Kiefernweg 9, D-7996 Meckenbeuren, Fed. Rep. of Germany

[21] Appl. No.: 135,759

[22] Filed: Oct. 14, 1993

Related U.S. Application Data

[63] Continuation of Ser. No. 920,171, Jul. 27, 1992, abandoned, which is a continuation of Ser. No. 758,488, Sep. 9, 1991, abandoned, which is a continuation of Ser. No. 551,055, Jul. 11, 1990, abandoned, which is a continuation of Ser. No. 481,796, Feb. 20, 1990, abandoned, which is a continuation of Ser. No. 277,450, Nov. 28, 1988, abandoned, which is a continuation of Ser. No. 906,826, Sep. 12, 1986, abandoned.

[30] Foreign Application Priority Data

Sep. 18, 1985 [DE] Fed. Rep. of Germany ....... 3533191
Jul. 1, 1989 [DE] Fed. Rep. of Germany ....... 3622045

[51] Int. Cl.⁵ ............................................. F16H 47/04
[52] U.S. Cl. ........................................................ 475/81
[58] Field of Search ...................... 475/80, 81, 82, 83, 475/84

[56] References Cited

U.S. PATENT DOCUMENTS

| | | | |
|---|---|---|---|
| 3,433,095 | 3/1969 | Tuck | 74/687 |
| 3,597,997 | 8/1971 | Phillips | 74/687 |
| 3,855,879 | 12/1974 | De Lalio | 74/687 |
| 3,903,755 | 9/1975 | Polak | 74/687 |
| 3,969,957 | 7/1976 | De Lalio | 74/687 |
| 4,164,155 | 8/1979 | Reed et al. | 74/687 |
| 4,232,568 | 11/1980 | Maeda | 74/687 |
| 4,291,592 | 9/1981 | Meyerle et al. | 74/687 |
| 4,304,151 | 12/1981 | Meyerle et al. | 74/687 |
| 4,341,131 | 7/1982 | Pollman | 74/687 |
| 4,373,359 | 2/1983 | Ehrlinger et al. | 475/82 |
| 4,382,392 | 5/1983 | Meyerle et al. | 74/687 |
| 4,434,681 | 3/1984 | Friedrich et al. | 74/687 |
| 4,485,691 | 12/1984 | Reed | 74/687 |
| 4,682,515 | 7/1987 | Reed | 475/81 X |
| 4,754,664 | 7/1988 | Dick | 74/687 |
| 4,766,779 | 8/1988 | Massy | 475/83 X |
| 4,799,401 | 1/1989 | Reed | 74/687 X |

Primary Examiner—Dirk Wright
Attorney, Agent, or Firm—Staas & Halsey

[57] ABSTRACT

Stepless hydromechanical mechanism with multiple power-transmission paths, more particularly for motor vehicles, having at least two switching ranges in which the stepless control of the mechanism is effected by a hydrostatic transmission, in which the specific requirements on the hydrostatic unit are reduced to a minimum. The hydrostatic power content is reduced. The parameters determining noise, efficiency and service life, i.e., hydrostatic pressure, hydrostatic speed, as well as the values of these components and their arrangement are brought into acceptable and technically feasible bounds. To this end, two summation planetary gearing mechanisms are provided in which the input shaft of the transmission is drivingly connected to a first hydrostatic unit and to a first inlet shaft of the first summation planetary gearing mechanisms, and a second hydrostatic unit is connected to a second inlet shaft of the first summation planetary gearing mechanism and to a first inlet shaft of the second summation planetary gearing mechanism.

25 Claims, 10 Drawing Sheets

STEPLESS HYDROMECHANICAL MECHANISM WITH MULTIPLE POWER-TRANSMISSION PATHS, MORE PARTICULARLY FOR MOTOR VEHICLES

This application is a continuation of Ser. No. 07/920,171, filed Jul. 27, 1992, now abandoned with is a continuation of Ser. No. 07/758,488, filed Sep. 9, 1991, now abandoned, which is a continuation of Ser. No. 07/551,055, filed Jul. 11, 1990, now abandoned, which is a continuation of Ser. No. 07/481,976, filed Feb. 20, 1990, now abandoned, which is a continuation of Ser. No. 07/277,450, filed Nov. 28, 1988, now abandoned, which is a continuation of Ser. No. 06/906,826, filed Sep. 12, 1986, now abandoned.

The invention relates to a stepless hydromechanical with multiple power-transmission paths, more particularly for motor vehicles, having at least two switching ranges in which the stepless control of the mechanism is effected by a hydrostatic transmission.

U.S. Pat. No. 4,434,681 teaches a hydromechanical mechanism having multiple power-transmission paths with two switching ranges, which is simple in design, but which requires relatively large hydrostatic units and is very limited in its field of application, particularly if application in a relatively high power range is involved. Moreover, the speed level of the output elements is relatively high, so that in many applications an extra gearing stage is required on the output of the mechanism.

The other problems when employing the hydrostatic unit in the vehicle, particularly for the demanding passenger traffic, lie in the low efficiency and noise conditions.

The invention has for its object the provision of a hydromechanical mechanism with multiple power-transmission paths for motor vehicles which lowers the specific requirements on the hydrostatic unit to a minimum, that is to say, which reduces the proportion of hydrostatic power and brings the parameters determining noise, efficiency and service life, such as hydrostatic pressure, hydrostatic speeds as well as the values of these components and their arrangements into acceptable and technically feasible bounds. Furthermore, a considerable capacity to adapt to different vehicle-specific requirements is a prerequisite. The speed level shall be such that the need for adaptation of the transmission ratio on the output end can be eliminated to the highest degree possible. In addition to a high efficiency during operation, i.e., by savings in consumption through exploitation of the best possible consumption values of the engine, etc., a high efficiency is also to be achieved by a risk-free rational fabrication. Moreover, a modular construction that is easy to assemble and to service with assembly ana service is to be realized, as is a compact, vehicle-oriented overall design.

This object is achieved by present invention which provides a stepless, branched, hydromechanical mechanism having a power input shaft, a power output shaft and multiple path power transmission means for transmitting power in at least two speed ranges from said input shaft to said output shaft. The power transmission means includes hydrostatic drive means drivably connected to said input shaft and comprising a variable speed drive unit and a driven unit equipped with a first hydrostatic power outlet. The power transmission means also includes first summation planetary gearing means having a second power outlet and second summation planetary gearing means having a third power outlet. The first summation planetary gearing means is operably interconnected with the first power outlet and the input shaft for summing the power therefrom and transmitting the summed power to the second power outlet, and the second summation planetary gearing means is operably interconnected with the first and second power outlets for summing the power therefrom and transmitting the summed power to the third power outlet. Also included are means for selectively operably coupling the power output shaft with the second power outlet or the third power outlet to thereby switch the mechanism from one of its speed ranges to the other. Further advantageous embodiments of the invention are apparent from the subclaims and from the ensuing description.

The invention will be discussed by reference to practical embodiments shown in the accompanying drawings, in which.

Figure 2:
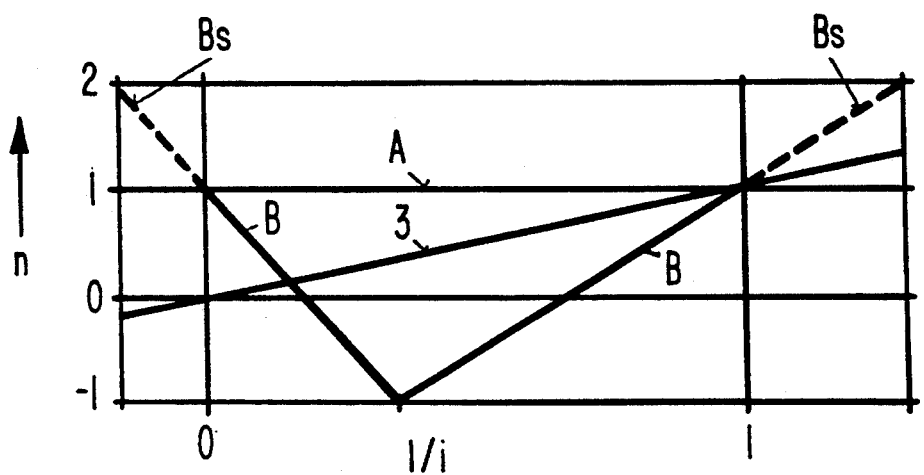
Figure 3:
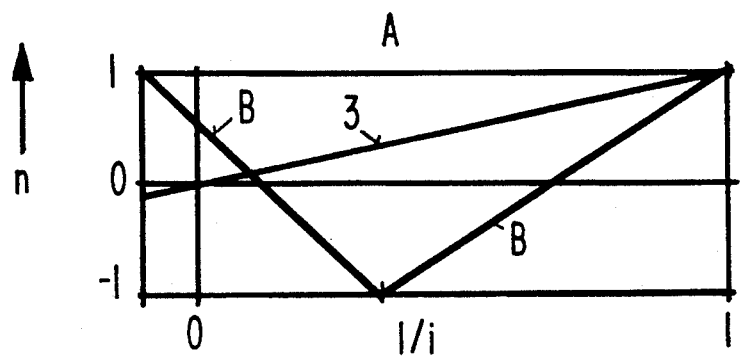
Figure 4:
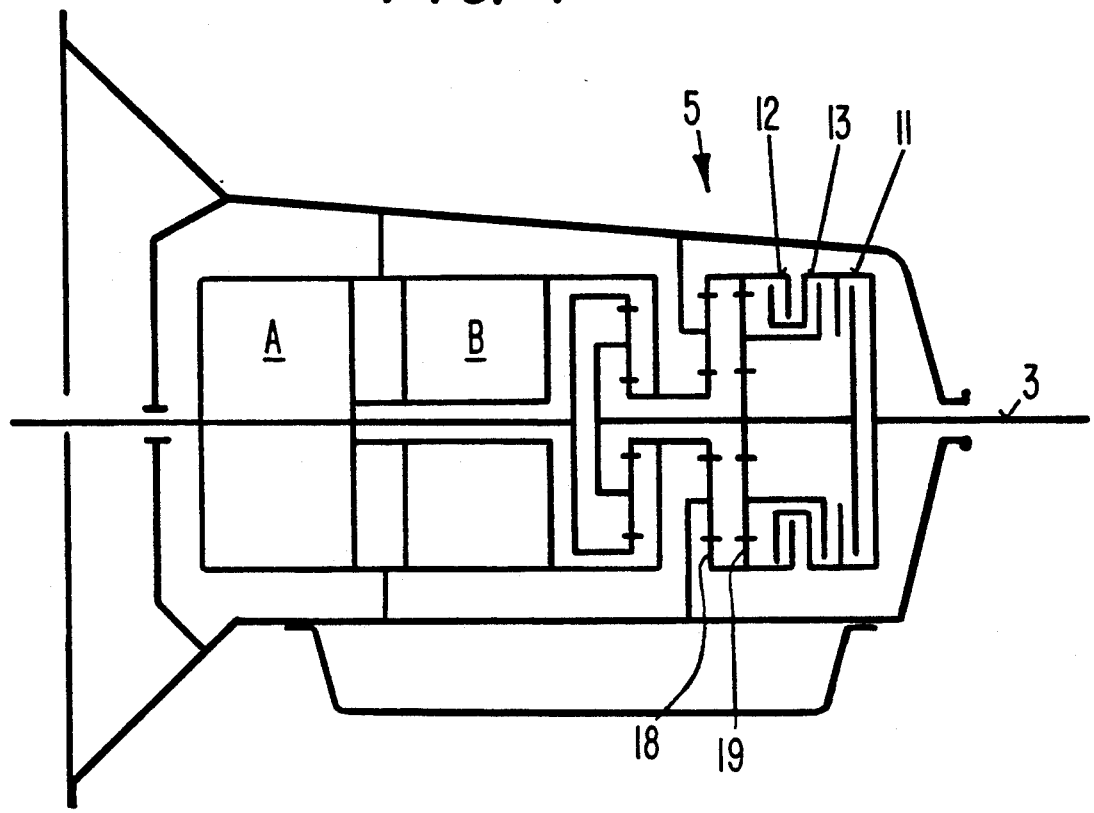
Figure 5:
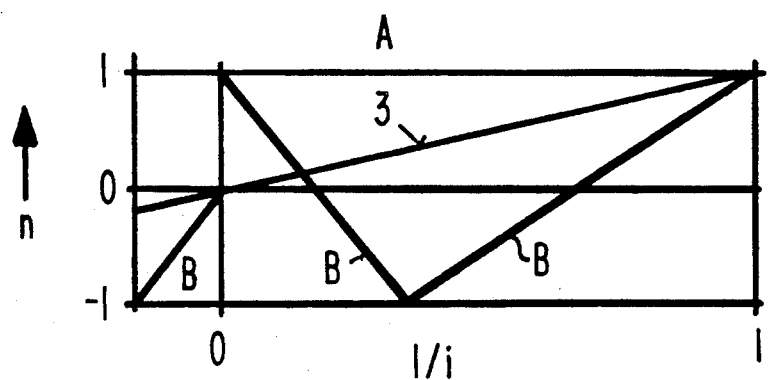
Figure 6:
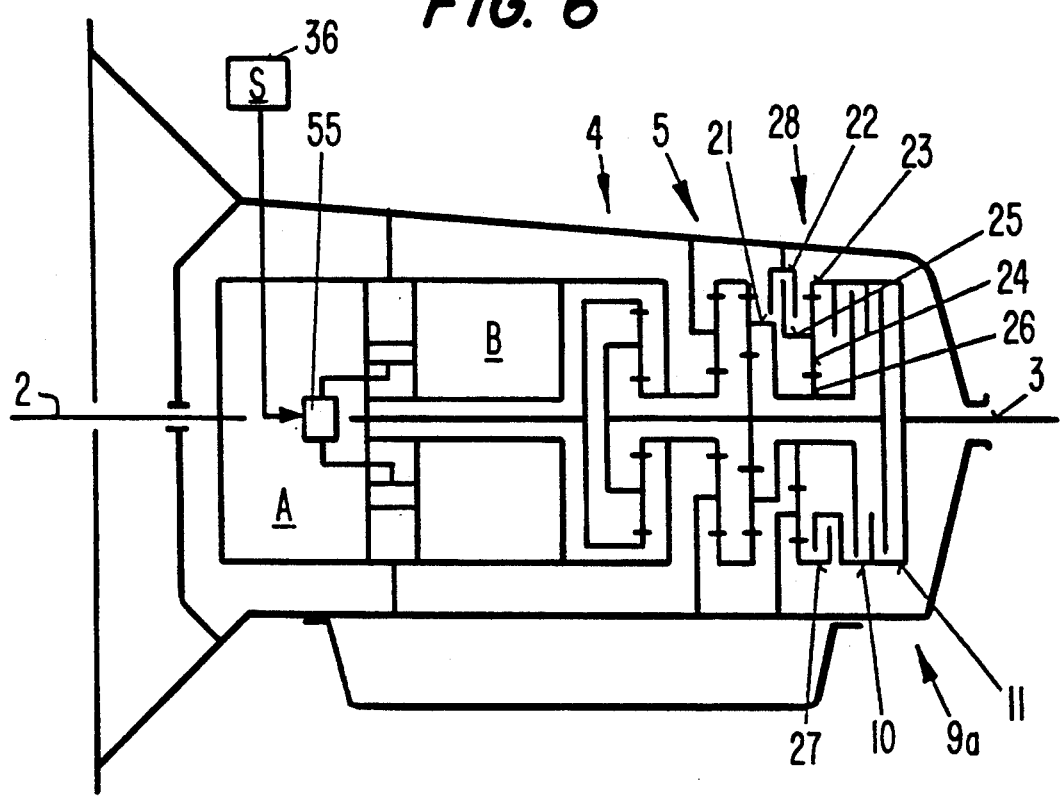
Figure 7:
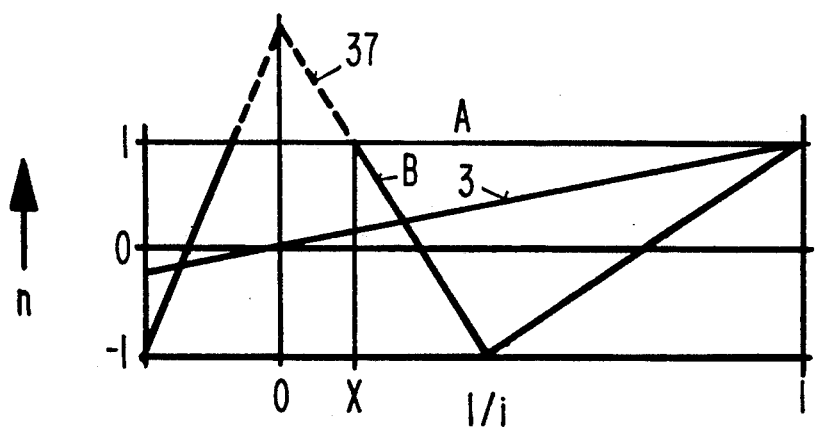
Figure 8:
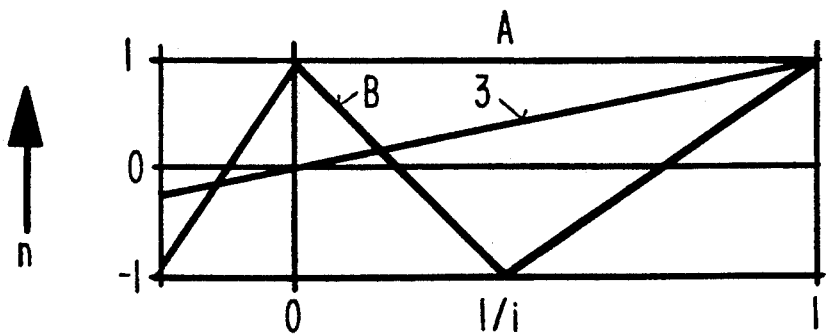
Figure 9:
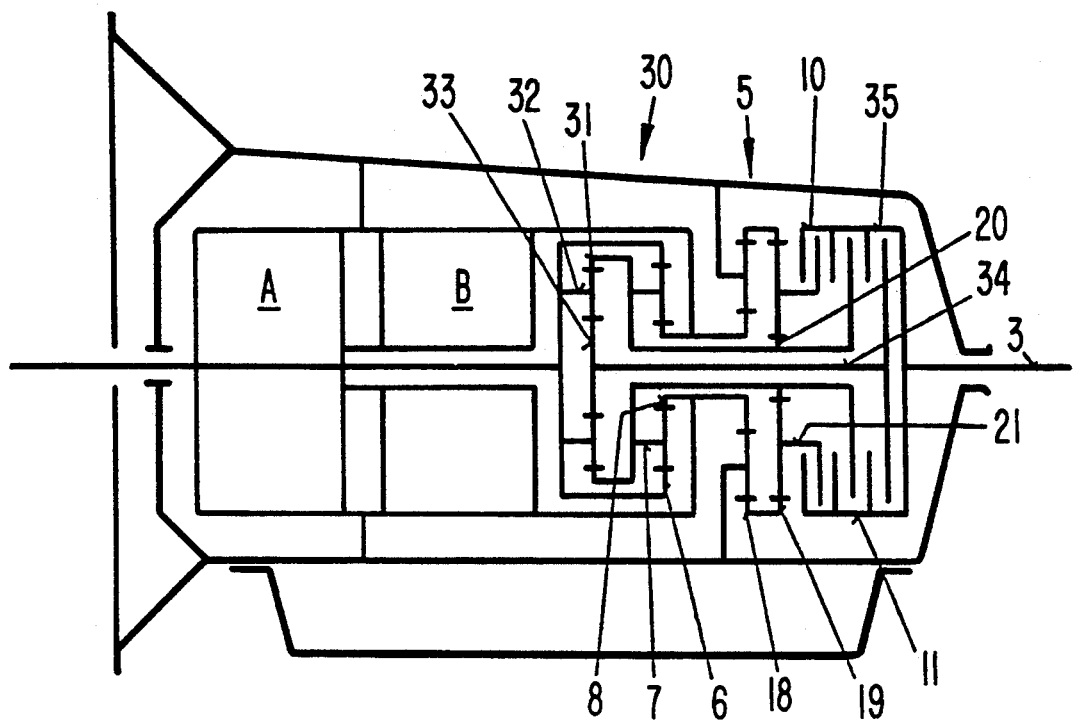
Figure 10:
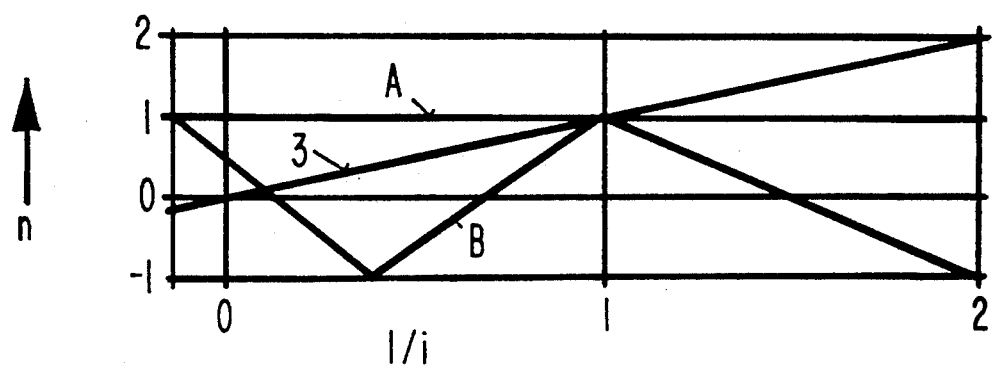
Figure 11:
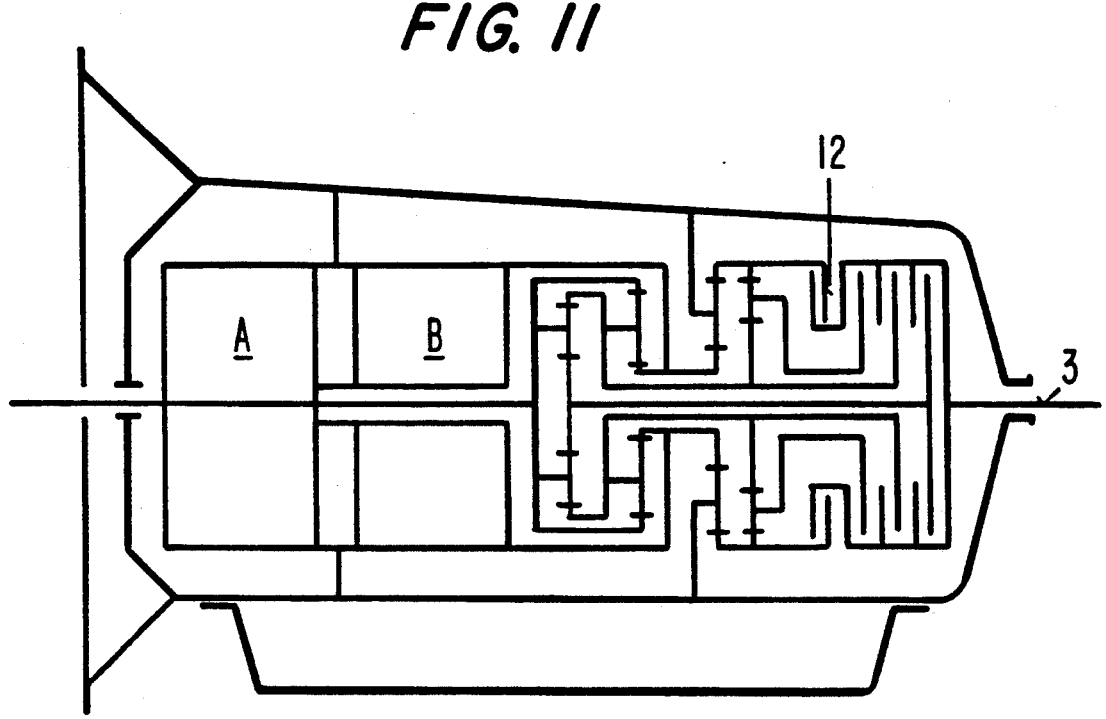
Figure 12:
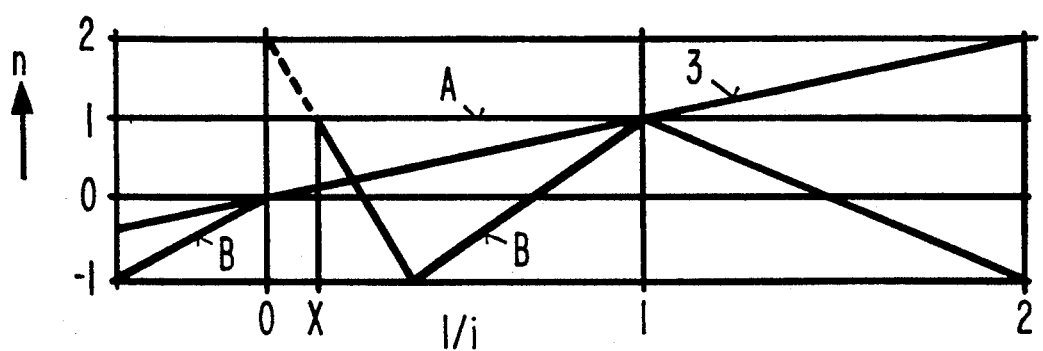
Figure 13:
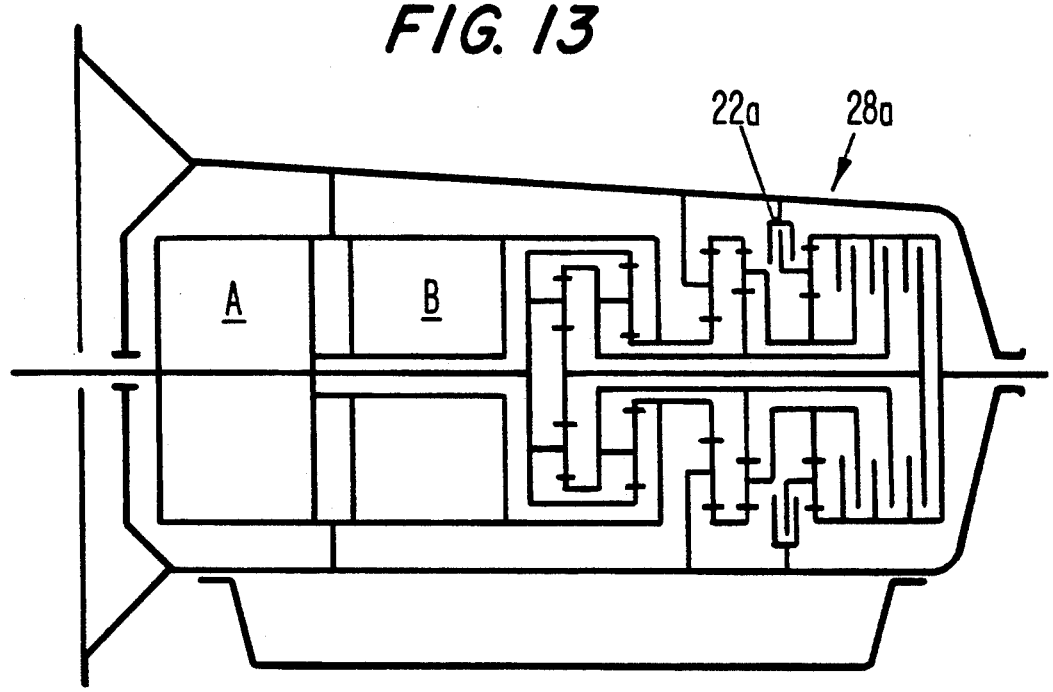
Figure 14:
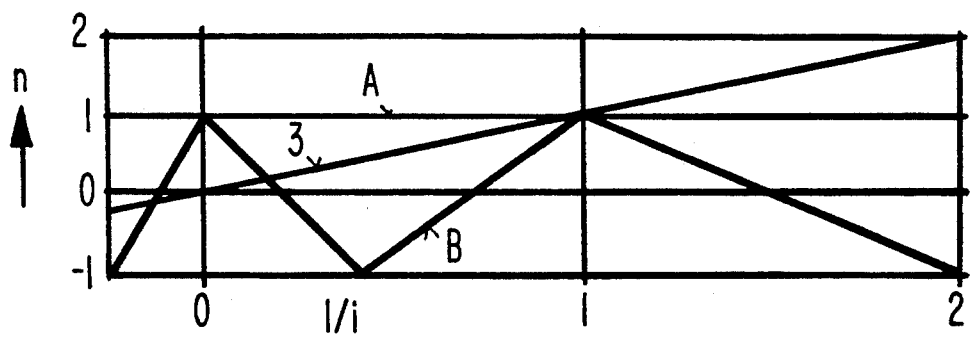
Figure 15:
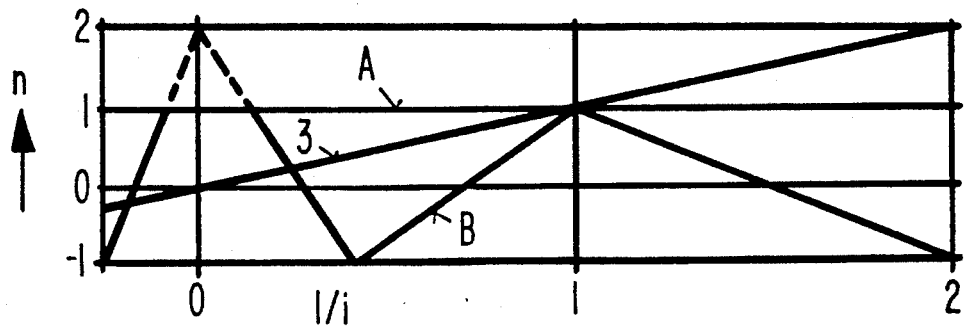
Figure 16:
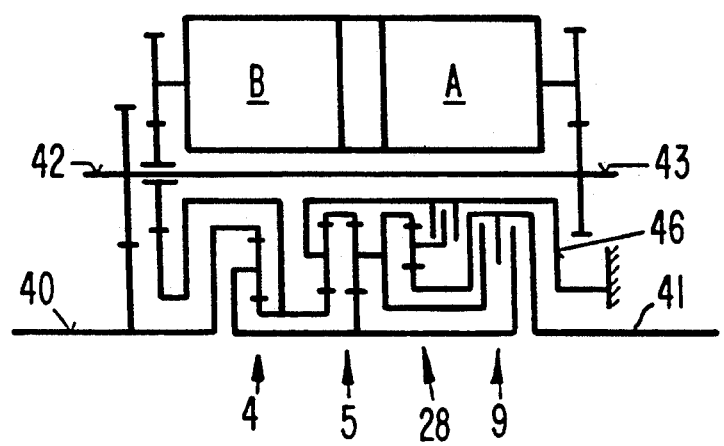
Figure 17:
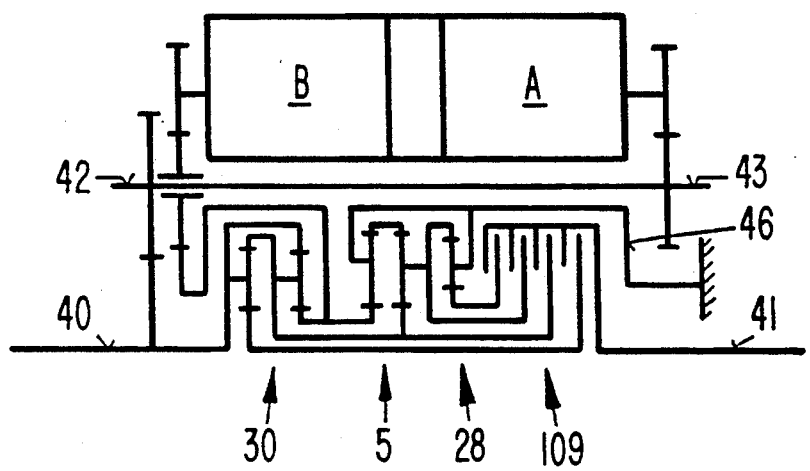
Figure 18:
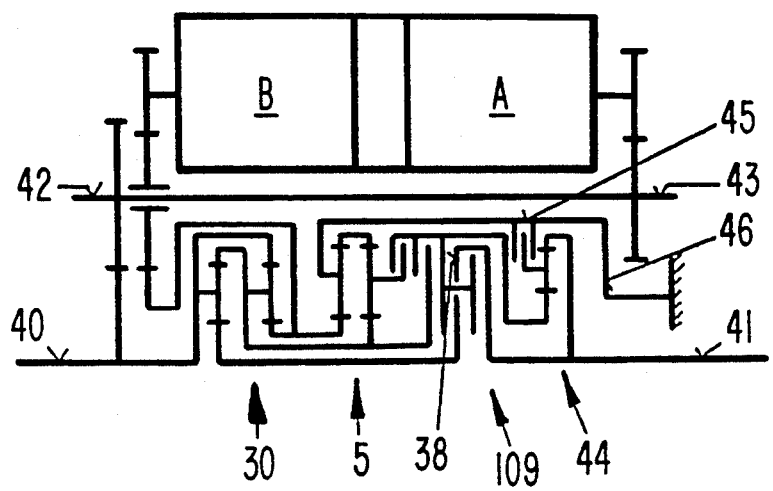

FIG. 2 is a speed diagram of the first and second practical embodiments, each with secondary control, FIG. 3 is a speed diagram of the first and second practical embodiments without secondary control, FIG. 4 is a schematic representation of a third practical embodiment, FIG. 5 is a speed diagram of the third practical embodiment of FIG. 4, FIG. 6 is a schematic representation of a fourth practical embodiment, FIG. 7 is a speed diagram of the fourth practical embodiment with the speed expansion of FIG. 6, FIG. 8 shows a speeg diagram of the fourth practical embodiment without the speed expansion of FIG. 6, FIG. 9 is a schematic representation of a fifth practical embodiment with three forward operating ranges and an integrate reverse operating range, FIG. 10 shows a speed diagram of the practical embodiment of FIG. 9, FIG. 11 is a schematic representation of a sixth practical embodiment with three forward operating ranges with speed expansion and a separate hydrostatic reverse operating range, FIG. 12 is a speed diagram for the practical embodiment of FIG. 11, FIG. 13 is a schematic representation of a seventh practical embodiment with three forward operating ranges and a separate, hydromechanical reverse operating range, FIG. 14 is a speed diagram for the practical embodiment of FIG. 13, FIG. 15 is a speed diagram for the practical embodiment of FIG. 13, with speed expansion in the first forward operating range and in the first reverse operating range, FIG. 16 is a schematic representation of an eighth practical embodiment with two forward operating ranges and a separate hydromechanical reverse ana forward operating range for use in heavy vehicles, FIG. 17 is a schematic representation of a ninth practical embodiment with three forward operating ranges and a separate hydromechanical reverse operating range for heavy vehicles, particularly for tracked vehicles, FIG. 18 shows a tenth practical embodiment with three forward operating ranges and three hydromechanical reverse operating ranges for heavy vehicles.

Figure 19:
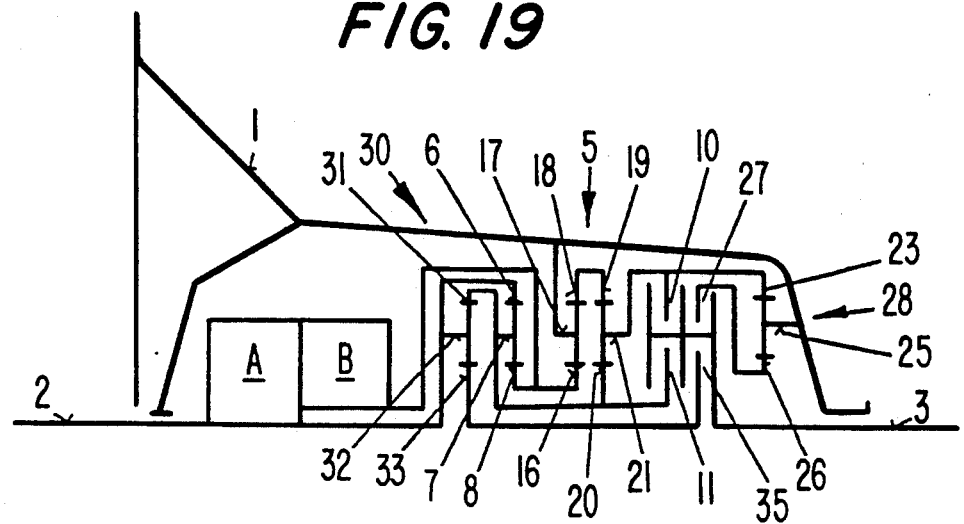
Figure 20:
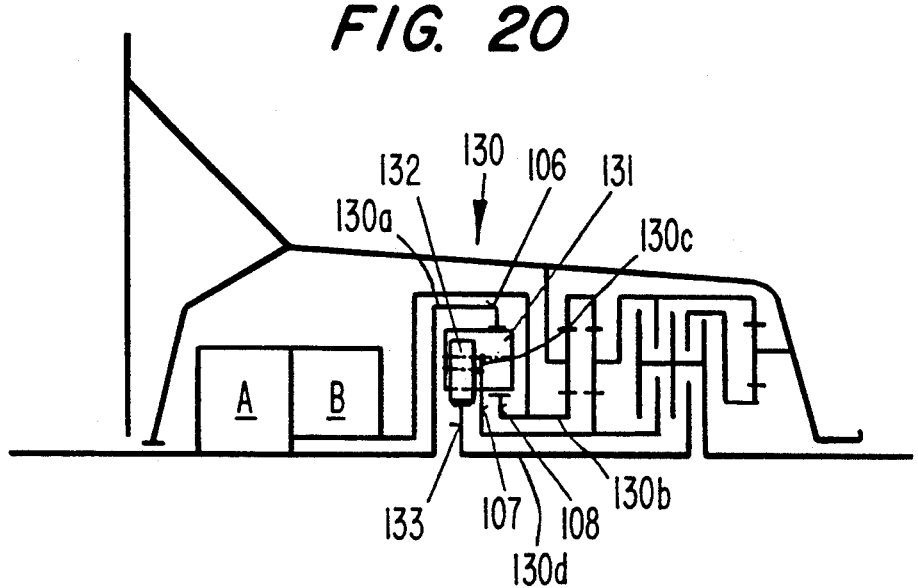
Figure 21:
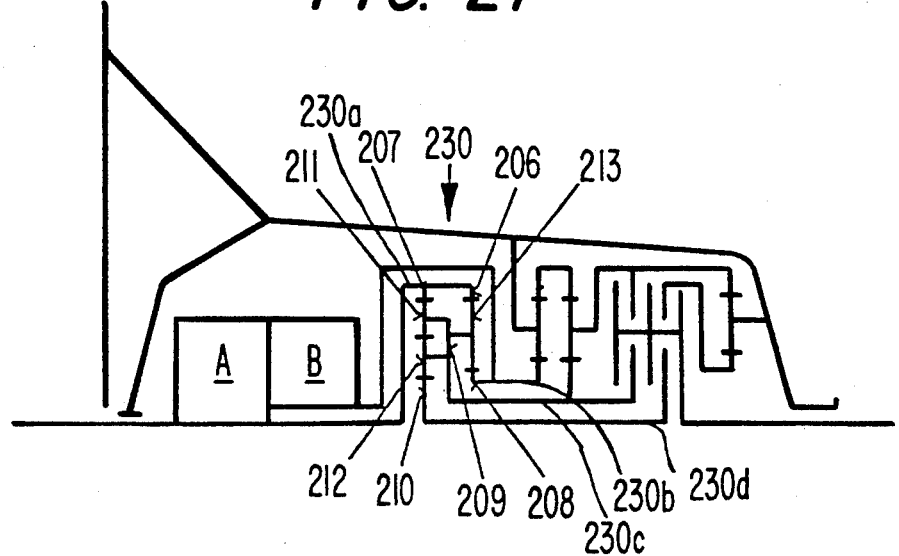
Figure 22:
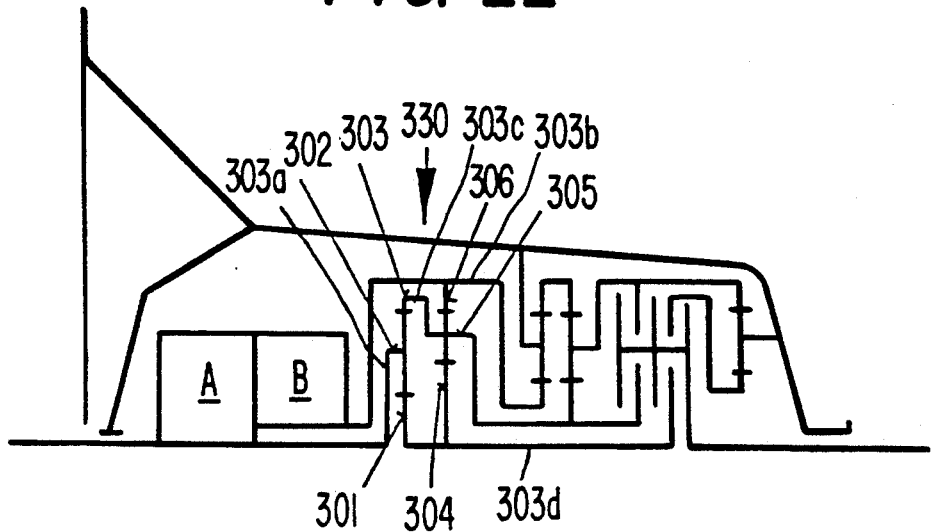
Figure 23:
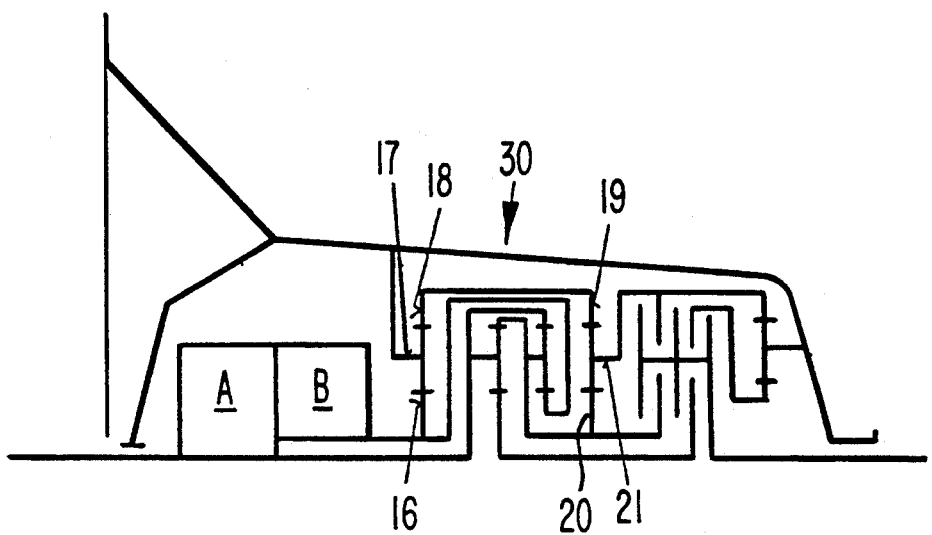

FIG. 19 is a schematic representation of another practical embodiment of a mechanism with a compact clutch packet, FIG. 20 shows another practical embodiment of the mechanism with interlocking planetary gears of the first summation planetary gearing, FIG. 21 is a schematic representation of another practical embodiment of the mechanism having another version of the summation planetary gearing, FIG. 22 shows another practical embodiment of the mechanism with a fourth practical embodiment of the summation planetary gearing, FIG. 23 shows another practical embodiment of the mechanism with a split, second summation planetary gearing.

By combining a first summation planetary gearing 4 (FIG. 1) with a second summation planetary gearing 5, the speed of a second hydrostatic unit B can be made to lie in the starting range of the vehicle in the same direction (FIGS. 2, 3) as the drive speed. The two summation planetary gearings 4, 5 have opposite directions of rotation at the end of the first switching range.

After switching over to the second operating range, the speed of the hydrostatic unit B is returned until the speed of an input shaft 2 is attained. At this point, all the elements of the first summation planetary gearing 4 as well as the two hydrostatic units A, B and the input shaft 2 turn in the same direction with identical speed, i.e., in synchronism. At the end of the second switching range, the ratio of the input shaft to the output shaft equals 1. If the second hydrostatic unit B is designed as an adjusting unit, the output speed can be increased further by secondary adjustment which, for many applications, is of advantage for the provision of an extra overdrive range. Here, the speed of the output shaft 3 is still relatively low, so that the usual speed ratios of the vehicles can be used.

Because of the secondary control (FIG. 2), the reverse operating range can be realized without an extra clutch or other transmission elements. The design of the transmission is relatively simple. All the elements can be made with conventional fabrication methods and the modules of the summation planetary gearings 4, 5 and the clutch packet 9 can simply be combined into one basic unit or subassembly. The transmission ratios (FIG. 3) in both summation planetary gearings 4, 5 are so designed that the hydrostatic unit A at start-up has not yet swung out to its maximum end position, but to about 60% of its maximum setting. After the hydrostatic unit A has swung out to its maximum end setting, the output shaft 3 receives from this point onwarad a negative speed for reverse velocity. In this practical embodiment, no secondary adjustment is necessary.

In another practical embodiment (FIG. 1a), there serves, instead of the clutch 10 (first range clutch), a brake 10a for the locking of the carrier 17a during first range circuit operation. In this range, the input shaft 2 is connected directly to the carrier 21 of the planetary stage consisting of an internal gear 19 and a sun gear 20. At the end of the second switching range all the elements of the first summation planetary gearing 4 and of the second summation planetary gearing 5 revolve, including the clutch 11, the input shaft 2 and both hydrostatic units A, B. Due to the elimination of the relative speeds within this range, the rolling power and thus also the efficiency of transmission are very favorable. As a result of the usually low relative speeds in the second range which, when used in a passenger car, has over 80% operating content, the rolling and power loss can be reduced to a minimum. As a result, the secondary control of the hydrostatic transmission A, B (see speed line Bs in FIG. 2) can especially be utilized for the benefit of a large overdrive range (FIG. 2), all the more so since at the same time the reverse operating range can also be realized very inexpensively.

Figure 1:
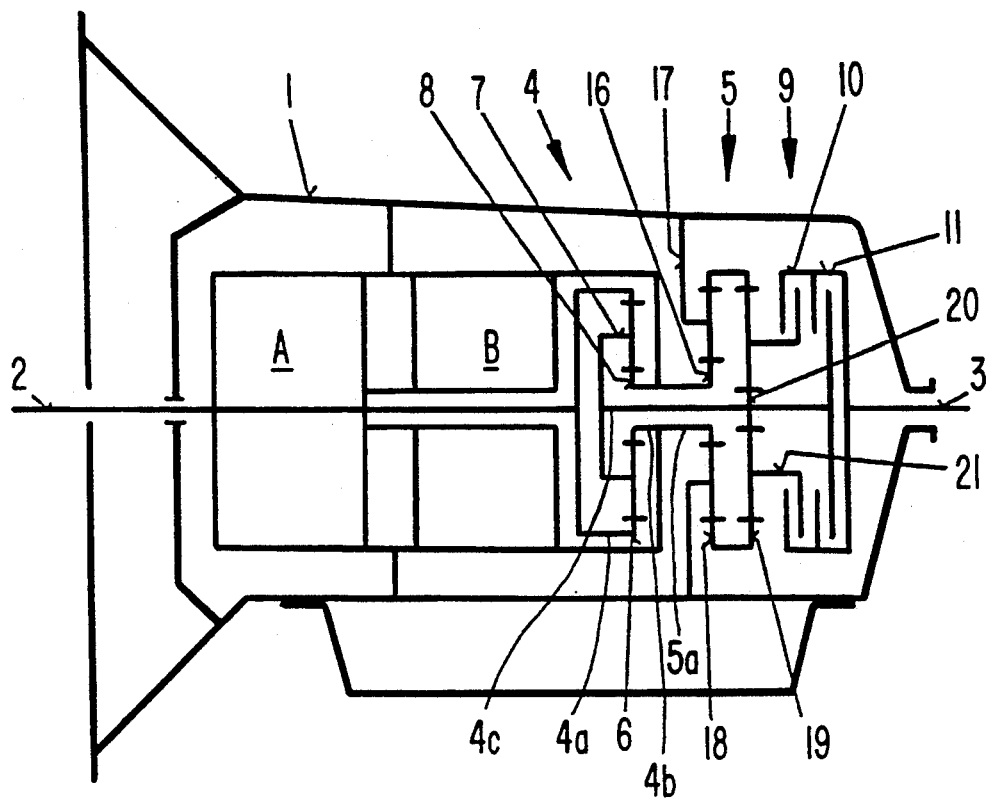
FIG. 1 is a schematic representation of a first practical embodiment.
Figure 1A:
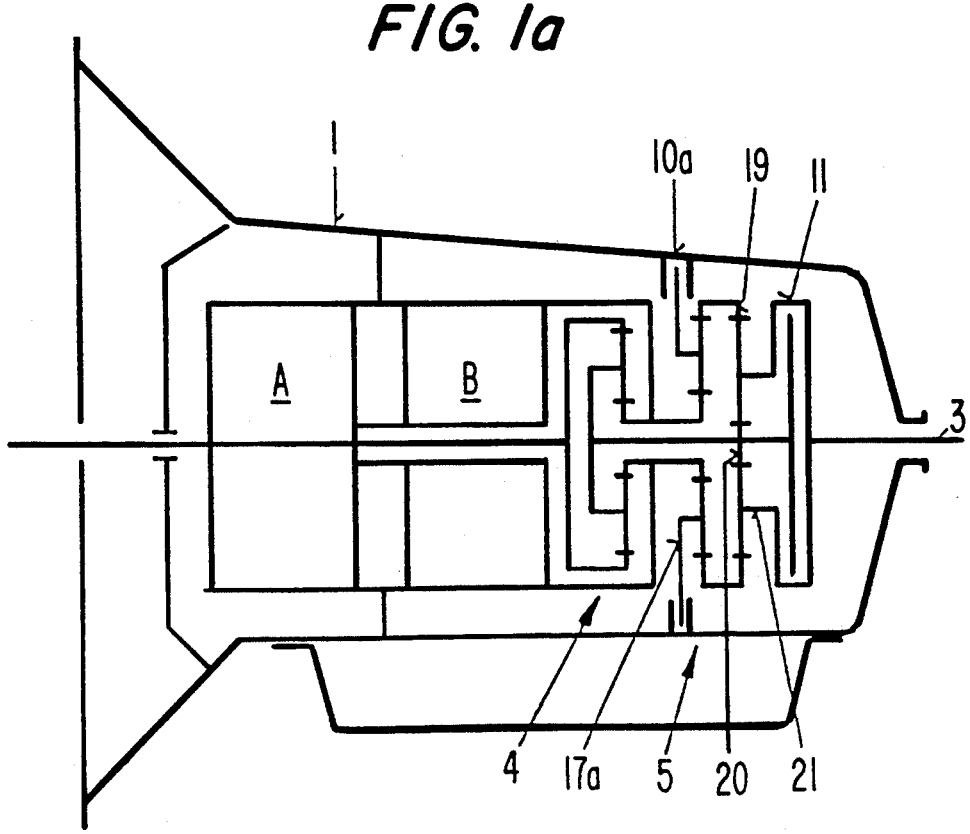
FIG. 1a is a schematic representation of a second practical embodiment.

The practical embodiment depicted in FIG. 4 differs from that of FIG. 1 in that an extra clutch 12 is provided for the reverse operating range. Here, a direct connection is provided via the two internal gears 18, 19 of the summation planetary gearing 5 to the second hydrostatic unit B, as a result of which a purely hydrostatic transmission in the reverse operating range is made when the clutch 12 is closed. In this practical embodiment, the full range of variation of the hydrostatic transmission in the first switching range can be utilize for the benefit of a higher power capacity when compared to the practical embodiment shown in the speed diagram of FIG. 3 in which the reverse operating range is integrated into the first switching range as well (FIG. 5).

A practical embodiment shown in FIG. 6 has a separate reverse switching range by the addition of a second planetary gear 28 and a clutch 27 (lower portion of FIG. 6) or brake 22 (upper portion of FIG. 6). Thus, in this practical embodiment a large reverse operating range is possible, as is usually the case in passenger cars. This gear combination is particularly very appropriate when used in commercial vehicles or buses or even in driven machines. Here, in comparison to the previously mentioned practical embodiments, there is the further possibility of expanding the power capacity of the transmission by expanding the speed range of the second hydrostatic unit B. That means that in the starting range, the speed of the second hydrostatic unit B can be designed relatively much higher compared to the first hydrostatic unit A and thus to the input shaft 2, and this serves to increase the starting tractive forces or to augment the torque multiplication range of the whole transmission. This can be realized by adapting the transmission ratio in the second summation planetary gearing 5 according to the desired expansion range, as a result of which, by means of the summation planetary gearing at start-up, the second hydrostatic unit B can be driven with a speed which is higher than that of the first hydrostatic unit A. This means that in equally large capacities or displacements of the hydrostatic unit A to the hydrostatic unit B there is an increased delivery of the hydrostatic unit B which is delivered by a supplementary device, e.g. by means of a bypass valve 55 at start-up for equalization to the low-pressure side of the hydrostatic circuit. The start-up control is performed by causing the bypass valve 55 to receive a signal 36 that can either be a speed signal and/or a signal from the brake actuation device and/or a load signal.

The speed diagram depicted in the practical embodiment of FIG. 6 shows in a broken line 37 the speed expansion device of the hydrostatic unit B. In this practical embodiment, the maximum speed ratio of hydrostatic unit B to hydrostatic unit A is 1:2. Here, the function of the bypass valve 55 replaces the function of a starting clutch as known in another, complex transmission of this type.

Another practical embodiment of a transmission with three forward switching ranges will be described with reference to FIG. 9 in which the reverse range is integrated into the first switching range as well (as apparent from the corresponding speed diagram of FIG. 10). The basic units are largely identical to the structures described above. The principal difference lies in the fact that the first summation planetary gearing 30 is expanded by an extra planetary gearing consisting of an internal gear 31, a carrier 32, and a sun gear 33. Here, the fourth shaft forms the sun gear 33, which, upon switching to the first operating range, is connected to the output shaft 3 by an extra clutch 35. In this practical embodiment, the reverse range is integrated into the first switching range as well, which, as shown in the corresponding speed diagram (FIG. 10), is switched with the clutch 10 closed, which serves at tile same time for the first operating range. Here, the third range can be realized with relatively low cost, so that a doubling of the torque multiplication range, i.e. a doubling of the power capacity of the whole transmission is achieved. In this practical embodiment, the output speed increases by twice the amount of the input speed. An overdrive range of about twice the value of the transmission ratio range is to be chosen, taking into consideration the savings potential offered by today's internal combustion engines. This means that this gearing design offers ideal conditions while preserving the usual axial speed ratio so as to be able to fully utilize the consumption savings potential offered, e.g. in the passenger car area. Hence, this gearing design is distinguished by a very large torque converter range and thus by an adequate overdrive range in the case of very small hydrostatic units, which guarantees the additional advantage of a very favorable transmission efficiency and a low specific load of the hydrostatic units. This practical embodiment also overcomes the noise problems.

According to another practical embodiment shown in FIG. 11, if relatively high reverse speeds are required, the gearing design describe above can be expanded by an extra clutch for the reverse range which, as in the design illustrated in FIG. 4, is engaged purely hydrostatically by means of the clutch 12. In this practical embodiment, the first operating range can be designed with speed expansion of the second hydrostatic unit B similar to the practical embodiment of FIG. 6 and according to the speed diagram in FIG. 7 for the benefit of a still larger conversion range in accordance with the high passenger-car performance categories or even when used in commercial vehicles, buses or driven machines (FIGS. 17, 18 ).

Another practical embodiment shown in FIG. 13 meets very high demands in terms of power capacity, driving performance and overall driving comfort. It offers three forward operating ranges and a separate power-split reverse operating range whose value can be adapted at will by appropriate ratio adaptation of another planetary gearing and of the range switching by means of a brake 22a. The first operating range can likewise be constructed with a range expansion for the benefit of a wide conversion range, which is also applicable to the reverse range. The magnitude of the reverse speed can be equalized by adapting the transmission ratio of a planetary gearing 28a to the requirements, which is also apparent from the relevant speed diagrams (14, 15).

Another practical embodiment shown in FIG. 16 which, in terms of its basic units, is identical to the practical embodiments described above, differs only in the arrangement of the hydrostatic units A, B which, in this instance, are staggered in relation to the elements of the mechanism with multiple power-transmission paths, i.e. the summation planetary gearings 4, 5, the planetary gearing 28, and the clutch 9, especially with respect to assembly requirements that must be met in commercial vehicles, buses or driven machines. In this practical embodiment, the drive motor can be connected to different points. Input shafts 40, 42 an the rive connection 43 are available for this purpose, which is very advantageous in the required manifold assembly requirements of the vehicles.

Another practical embodiment (FIG. 17) corresponds essentially to the assembly requirements of heavy vehicles, such as buses, commercial vehicles, driven machines and particularly tractor vehicles, aria has three forward operating ranges and a separate reverse operating range with power splitting. This practical embodiment has, especially for use in buses, particular advantages with respect to fuel savings, environmental compatibility an driving comfort. The third range can be utilized almost entirely as overdrive range for fuel savings.

For vehicles with a high reverse velocity, another practical embodiment (FIG. 18) offers three forward operating ranges and three reverse operating ranges, whereby the reverse operating range in the overall speed can be adapted at will by an extra reverse planetary gearing 44. This practical embodiment is of particular advantage for driven machines, such as bulldozers or tracked vehicles of any type. The overall characteristics correspond to the gearing design according to the practical embodiment depicted in FIG. 13, whereby the entire forward operating range is reversed by the reversing planetary gearing 44 and a clutch/brake 45. This practical embodiment, too, like those shown in FIGS. 16 and 17, offers the advantage of different connecting options for internal combustion machines.

The mechanism with multiple power-transmission paths offers the advantage that all components can be made and mounted with ease, thereby ensuring an almost risk-free fabrication. Moreover, in all the practical embodiments a modular design can be realized which is easy to service. The individual subassemblies, i.e. the first summation planetary gearing, the second summation planetary gearing, the clutch packet as well as the extra elements for achieving the reverse speeds, can be combined into individual modules. Depending on the gearing design, the individual modules themselves can be assembled together into a main group, as for example in the practical embodiments shown in FIGS. 16, 17, 18 in which in each instance the second summation planetary gearing, the clutch packet and the reversing gear case or reverse unit are assembled together in a housing 46, 47, which overlaps all the subassemblies, into a module that can be introduced into the gear case with ease and fixed therein, so that the machining of the case can be reduced to a minimum. Furthermore, the advantage of manifold variation options with respect to a wide field of application can be fully utilized.

The input shaft 2 (FIG. 1), which is connected to the crankshaft of the drive motor without a disconnect-type clutch, drives directly the first hydrostatic unit A as well as the first power inlet shaft 4a of the summation planetary gearing 4, wherein the shaft 4a in this practical embodiment is configured to carry an internal gear 6. If the gearing is designed according to the speed diagram of FIG. 2, the first hydrostatic unit A and the second hydrostatic unit B have identical speeds and identical directions of rotation, which means that all the elements of the summation planetary gearing 4 run in synchronism. A second power inlet shaft 4b, of the first summation planetary gearing 4, and the first power inlet shaft 5a, of the second summation planetary gearing 5, which shafts are configured to carry sun gears 8 and 16 respectively, are drivingly connected to the second hydrostatic unit B. Therefore, the hydrostatic power from unit B is split between the two summation planetary gearings 4, 5.

The power summed up in the first summation planetary gearing 4 is transmitted via the carrier 7 in the first operating range to the sun gear 20 of the second summation planetary gearing unit 5, wherein at the same time additionally a partial power flows via shaft 5a and the two internal gears 18, 19 of the second summation planetary gearing 5, which additionally sums up the summation power of the sun gear 20, and the total power is transmitted via the carrier 21 of the second summation planetary gearing 5,—with the clutch 10 for the first operating range closed—to the output shaft 3. At startup, the first hydrostatic unit A is set to its full adjustment value. If the hydrostatic unit A is now set at lower adjusting values, the carrier 21 and hence the output shaft 3 start to turn. In a hydrostatic setting beyond the zero position up to the maximally negative end setting, all the elements of the clutches 10, 11 run in synchronism, so that the switching to the second range can occur by closing the clutch 11 and opening the clutch 10. Here, a direct connection is established between the output shaft 3 and the output shaft 4c of the first summation planetary gearing 4, via the carrier 7. The second summation planetary gearing 5 is fully unloaded within the second operating range. If the second hydrostatic unit B is designed as an adjustment unit, the second range can be expanded by secondary control for the benefit of a wider overdrive range. In FIG. 2, the expanded secondary control range is denote by the broken line Bs. The secondary control of the hydrostatic unit B can likewise be employed for the reverse operating range. The hydrostatic unit consisting of the hydrostatic unit A and the hydrostatic unit B is now again returned to zero and upwards until, at the end of the second operating range, all the elements of the first summation planetary gearing 4 run in synchronism.

The above mentioned operational sequence within the first and second operating range is of the same kind in the other practical embodiments. In the practical embodiments with three reverse operating ranges, e.g. as shown in FIG. 9 with the speed diagram of FIG. 10, the switching to the third operating range occurs when all the elements of the first summation planetary gearing 30 run in synchronism while, at the same time, all the elements of the two clutches 11 and 35 run in synchronism. Now, in the third operating range, the hydrostat will once again fully traverse within its full positive an negative range of variations.

To start the engine, the first hydrostatic unit A is set at "zero" capacity, e.g. by a mechanical spring center such as is known in simple hydrostatic drives in order, especially in the cold state, to avoid engine start resistances due to the resistances to flow in the hydrostatic circuit.

In order to improve the transmission efficiency or to avoid unnecessary operating losses, the oil pressure for the closing of the range clutches and for the supply of the hydrostatic circuit is adapted in a per-se known manner, e.g. in accordance with the particular load conditions through load-dependent modulation, e.g. by means of the high pressure of the hydrostatic transmission.

Another advantage lies in the fact that the adjustment speed of the transmission can be adapted to the particular operating conditions through appropriate load-dependent control, e.g. by means of a controllable throttle valve for the metering of the amount of oil in an actuating cylinder by means of the high pressure of the hydrostatic transmission. The range switchings are practically smooth, because they are carried out when the clutch elements are running in synchronism and, in a manner known in itself, have a load overlap, during which both clutches are closed for a short time.

Another practical embodiment of the mechanism with multiple power-transmission paths (FIG. 19) is distinguished by a particularly compact design. The range clutch 10 for the first forward operating range loaded with a fairly high torque and the range clutch 27 for the reverse operating range likewise loaded with a fairly high torque are arranged in tandem with the two clutches 11, 35, which are loaded with the lower torques of the second operating range and of the third operating range. In this way, the whole clutch packet can be given a compact design.

Another advantage lies in the fact that the oil connections for all the range clutches 10, 11, 35, 27 can be established directly via the shaft connected to the output shaft 3. All the clutches have the same clutch element, by means of which the direct oil connection to the clutches can be lodged at low cost. On tile output end, the reversing planetary gearing 28 is fitted downstream of the clutch packet, whereby its internal gear 23 is connected to the carrier 21 of the second summation planetary gearing 5 and to a clutch element of the first range clutch 10. The carrier 25 of the reversing planetary gearing stage 28 is fixed to the housing and the sun gear 26 thereof is connected to an element of the clutch 27 of the reverse operating range.

As shown in FIGS. 20, 21, 22, the first summation planetary gearing 130, 230, 330 can be designed in different ways. The summation planetary gearing 130 (FIG. 20) has two interlocking first planetary gears 131 an second planetary gears 132, which are supported together on a carrier 107. The first shaft 130a of the summation planetary gearing 130 is connected to the internal gear 106, which engages in first planetary gears 131, the second shaft 130b is connected to the sun gear 108, which likewise engages in first planetary gears 131, and the fourth shaft 130d is connected to the sun gear 133, which meshes with second planetary gears 132. The third shaft 130c forms the carrier for the planetary gears 131, 132.

The summation planetary gearing (FIG. 21) consists of a first planetary stage with the sun gear 208, the planetary gears 213 and the internal gear 206, as well as a second planetary gearing stage with the sun gear 210 consisting of interlocking planetary gears 211, 212 and the internal gear 207. The first shaft 230a of the summation planetary gearing 230 is connected to the internal gear 206 of the first planetary gearing stage and to the internal gear 207 of the second planetary gearing stage. The second shaft 230b with the sun gear 208 of the first planetary gearing stage and the third shaft 230c constitute the carrier 209 for both planetary gearing stages.

The fourth shaft 230d of the summation planetary gearing is driven via the sun gear 210.

The summation planetary gearing 330 (FIG. 22) also consists of a first planetary gearing stage with the sun gear 301, the carrier 302 and the internal gear 303, as well as a second planetary gearing stage with the sun gear 304, the carrier 305 and the internal gear 306. The first shaft 303a of the summation planetary gearing 330 forms the carrier of the first planetary gearing stage, the second shaft 303b carried the internal gear 306 of the second planetary gearing stage. The third shaft 303c is connected to the internal gear 303 of the first planetary gearing stage and to the carrier 305 of the second planetary gearing stage, and the fourth shaft 303d of the summation planetary gearing is connected to the sun gear 301 of the first planetary gearing stage, as well as to the sun gear 304 of the second planetary gearing stage.

The various designs of the summation planetary gearings 130, 230, 330 are alternative solutions to the design of the summation planetary gearing 30. Depending on the particular specific requirements when fitting out different vehicles, there is a suitable selection possibility.

In order to improve the transmission efficiency, the hydrostatic components are operated in a per-se known manner in a housing that does not contain any oil. Here, the feeding and flushing valves are so designed—likewise in a per-se known manner—that the oil not needed for the leakage oil compensation and serving in particular for the flushing and cooling of the hydrostatic system is not sprayed into the hydrostatic case but, if necessary, is fed to other loads, such as range clutches, lubrication devices, etc., and the rest can preferably be discharged through the oil cooler. To this end, preferably two 3-way valves, generally known in principle as feed valves for hydrostatics, are arranged .. either side, whereby one valve is triggered for the feed-in and the other valve releases the low-pressure flow after the hydrostatic flushing ana cooling to the aforesaid secondary loads and, if necessary, to the cooler. Both valves, generally known as feed and flushing valves, are triggered by the high pressure concerned, as a result of which the path to the high-pressure side is closed and at the same time the oil passage on either side is opened under low pressure.

Instead of the bypass valve 55 (FIG. 7), the first range clutch 10 or reverse range clutch 22, 22a or 27 can also be employed for the start-up as a starting clutch which, with appropriate design, bridges the speed expansion (FIG. 7, see line 37) and the first starting range up to ratio point "X". The range clutch serving as a starting clutch can be triggered with identical signals as in the bypass valve 55.

I claim:

1. A stepless hydromechanical transmission having a power input shaft, a power output shaft and a multiple path power transmission mechanism for transmitting power in at least two hydrostatic-mechanical forward shift ranges from said input shaft to said output shaft, said power transmission mechanism comprising:
   a hydrostatic drive unit, said hydrostatic drive unit comprising a variable speed drive section which is drivingly connected to said power input shaft and a driven section having a hydrostatic power outlet shaft;
   a compounding summation planetary gear unit having at least five shafts and comprising first and second summation planetary gearing sections that are continuously drivingly interconnected by at least two shafts,
   said summation planetary gear unit having a first shaft that is in continuous driving connection with said power input shaft and a second shaft that is in continuous driving connection with said hydrostatic power output shaft,
   said hydrostatic power outlet shaft being in continuous driving connection with both of the summation planetary gearing sections,
   said mechanism being arranged such that in the initial starting stages of the first of said forward shift ranges said first and second shafts rotate in the same direction, and in a later stage of said first shift range said first and second shafts rotate in opposite directions.

2. A stepless hydromechanical transmission having a power input shaft, a power output shaft and a multiple path power transmission mechanism for transmitting power from said input shaft to said output shaft in at least tow hydrostatic-mechanical forward shaft ranges, and wherein all forward ranges operate in multiple power transmission paths, said power transmission mechanism comprising:
   a hydrostatic drive unit, said hydrostatic drive unit comprising a variable speed drive section which is drivingly connected to said power input shaft and a driven section having a first hydrostatic power outlet shaft;
   a compounding summation planetary gear unit having at least five shafts and comprising first and second summation planetary gearing sections, said second summation planetary gearing section having at least four shafts, said gearing sections being continuously drivingly interconnected by at least two shafts,
   said compounding summation planetary gear unit having a first shaft that is in continuous driving connection with said power input shaft and a second shaft that is in continuous driving connection with said hydrostatic power outlet shaft,
   said hydrostatic power outlet shaft being in continuous driving connection with both of the summation planetary gearing sections,
   said mechanism being arranged such that in the initial starting stages of the first of said forward shift ranges said first and second shafts rotate in the same direction, and in a later stages of said first shift range said first and second shafts rotate in opposite directions.

3. A transmission as set forth in claim 2, wherein said driven section is a variable speed section.

4. A transmission as set forth in claim 2, wherein said first summation planetary gearing section has three or four shafts.

5. A transmission as set forth in claim 2, wherein said first summation planetary gearing section has at least three shafts.

6. A transmission as set forth in claim 2, wherein apparatus is provided for selectively drivingly connecting a shaft of the second summation planetary gearing section with the output shaft.

7. A transmission as set forth in claim 2, wherein is included a third planetary summation gearing unit and apparatus for selectively drivingly interconnecting said second summation planetary gearing section and said output shaft.

8. A transmission as set forth in claim 2 wherein a bypass valve is provided between said drive section and said driven section of the hydrostatic drive unit.

9. A transmission as set forth in claim 6, wherein said apparatus for selectively connecting the second gearing section and the output shaft comprises a brake or a clutch.

10. A transmission as set forth in claim 2, wherein said hydrostatic sections are disposed in staggered relationship along said input shaft.

11. A transmission as set forth in claim 2, wherein said mechanism includes a reverse planetary gearing section and apparatus for selectively operatively connecting said reverse section with other components of said mechanism.

12. A transmission as set forth in claim 2, wherein the second summation gearing section includes a planet carrier that is drivingly connected to said output shaft and a brake is provided for selectively stopping said planet carrier.

13. A transmission as set forth in claim 2, wherein said input and output shafts extend outwardly from said mechanism in the same direction.

14. A transmission as set forth in claim 2, wherein separate clutch units are provided for selectively drivingly connecting the mechanism into each of said shift ranges, the clutch unit for one of said shift ranges being disposed radially outwardly relative to the clutch unit for another of said shift ranges.

15. A transmission as set forth in claim 2, wherein separate clutch units are provided for selectively drivingly connecting the mechanism into each of said shift ranges, said separate clutch units having a common clutch element in continuous driving connection with the output shaft.

16. A stepless hydromechanical transmission as set forth in claim 2, wherein said hydrostatic drive and driven sections and said first and second summation planetary gearing sections are concentrically arranged.

17. A transmission as set forth in claim 6, wherein said hydrostatic sections are arranged in an elongated packet and said summation planetary gearing unit and selective connecting apparatus are arranged in an elongated array, said packet and said array being arranged in a parallel disposition to facilitate mounting in a confined vehicle specific cross design.

18. A transmission as set forth in claim 2, wherein is included a reversing element.

19. A transmission as set forth in claim 2, wherein said driven section comprises a variable speed section having speed multiplication operational characteristics for creating a reverse-driving range and expanding forward shift ranges after said first gear range.

20. A transmission as set forth in claim 2, wherein is provided a reversing clutch for selectively connecting one of the shafts of said section gearing section to said output shaft to rotate the latter in a reverse direction.

21. A transmission as set forth in claim 2, wherein said drive section, said driven section, said first gearing section and said second gearing section each has a major axis of rotation and said axes are all coaxially aligned.

22. A transmission as set forth in claim 2, wherein each of said sections has a major axis of rotation, said axes all being disposed in parallel offset relationship relative to the axis of rotation of said input shaft.

23. A transmission as set forth in claim 2, wherein said driven section and said drive section each have a major axis of rotation, said axes each being disposed in parallel offset relationship relative to the axis of rotation of said input shaft, said input shaft being directly connected to a shaft of said first gearing section.

24. A transmission as set forth in claim 2, wherein said transmission include a housing and said second gearing section includes at least one planet carrier and a brake, said output shaft being connected to a planet carrier of said second gearing section, a planet carrier of said second gearing section being selectively connectable to said housing via said brake.

25. A transmission as set forth in claim 2, wherein said transmission includes a housing and said second gearing section includes two planetary gear stages, each of said stages comprising a sun gear, an internal gear and a carrier shaft, one of said carrier shafts being fixed to said housing, the other of said carrier shafts being selectively connected to said output shaft.

* * * * *

UNITED STATES PATENT AND TRADEMARK OFFICE
CERTIFICATE OF CORRECTION

PATENT NO. : 5,328,418

DATED : July 12, 1994

INVENTOR(S) : MICHAEL MEYERLE

It is certified that error appears in the above-indentified patent and that said Letters Patent is hereby corrected as shown below:

Column 1, line 8 after "abandoned" insert --,-- and delete "with" and substitute --which--;

line 17, after "hydromechanical" insert --mechanism--;

line 56, delete "ana" and substitute --and--;

line 58, after "by" insert --the features of the--.

Column 2, line 37, delete "speeg" and substitute --speed--;

line 41, delete "integrate" and substitute --integrated--;

line 62, delete "ana" and substitute --and--.

Column 3, line 3, delete "." and substitute --,--;

line 12, after "planetary" insert --gearing,--;

line 13, delete "gearing,";

line 32, delete "speed" and substitute --speeds--;

line 55, delete "onwarad" and substitute --onward--;

Column 4, line 21, delete "utilize" and substitute --utilized--.

UNITED STATES PATENT AND TRADEMARK OFFICE
CERTIFICATE OF CORRECTION

PATENT NO. : 5,328,418
DATED : July 12, 1994
INVENTOR(S) : MICHAEL MEYERLE

It is certified that error appears in the above-indentified patent and that said Letters Patent is hereby corrected as shown below:

Column 5, line 17, delete "tile" and substitute --the--;

line 21, after "transmission" insert --,--;

line 40, delete "describe" and substitute --described--.

Column 6, line 10, delete "an" and substitute --and--;

line 10 delete "rive" and substitute --drive--;

line 17, delete "aria" and substitute --and--;

line 22, delete "an" and substitute --and--;

line 56, delete "47,".

Column 7, line 5, after "4b" delete ",";

line 7, after "5b" delete ",";

line 19, after "5" delete ",";

line 22, after "5" delete ",";

line 40, delete "denote" and substiute --denoted--;

line 58, delete "an" and substitute --and--.

UNITED STATES PATENT AND TRADEMARK OFFICE
CERTIFICATE OF CORRECTION

PATENT NO. : 5,328,418
DATED : July 12, 1994
INVENTOR(S) : Michael Meyerle

It is certified that error appears in the above-indentified patent and that said Letters Patent is hereby corrected as shown below:

Column 8, line 33, delete "tile" and substitute --the--;

line 46, delete "an" and substitute --and--.

Column 9, line 10, delete "carried" and substitute --carries--;

line 36, delete ".." and substitute --on--;

line 39, delete "ana" and substitute --and--.

Column 10, line 21, delete "tow" and substitute --two--;

Column 11, line 1, after "2" insert --,--.

Signed and Sealed this

Twenty-ninth Day of November, 1994

Attest:

BRUCE LEHMAN

Attesting Officer

Commissioner of Patents and Trademarks